Patented Apr. 23, 1946

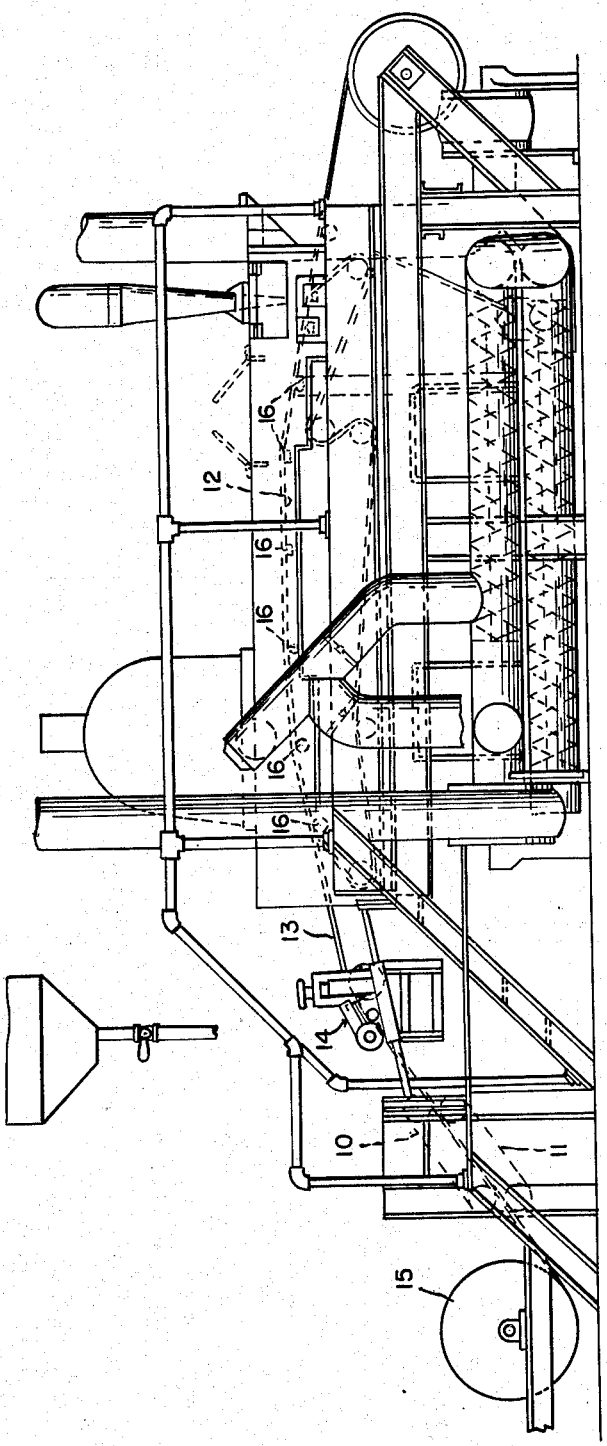

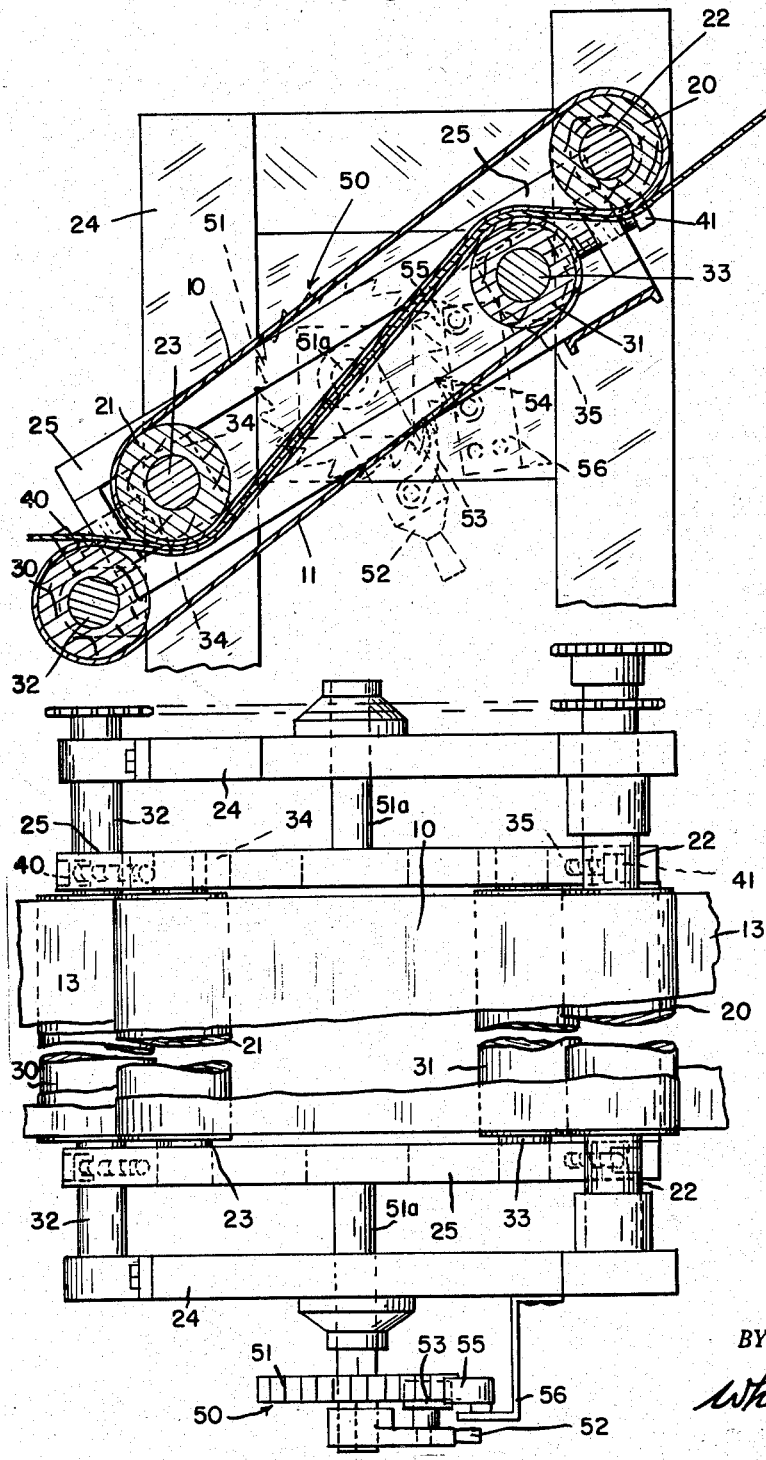

2,398,822

UNITED STATES PATENT OFFICE 2,398,822

TENSION DEVICE FOR SHEET MATERIAL

Harold P. Faris, Philadelphia, Pa., and John E. White, Trenton, N. J., assignors to National Automotive Fibres, Inc., Detroit, Mich., a corporation of Delaware Original application October 28, 1940, Serial No. 363,196, now Patent No. 2,347,816, dated May 2, 1944. Divided and this application April 24, 1943, Serial No. 484,433

8 Claims. (Cl. 242—154)

This invention relates generally to carpet making machines for manufacturing carpet of the cemented pile type and constitutes a division of our application filed October 28, 1940, bearing Serial No. 363,196, now Patent No. 2,347,816, dated May 2, 1944.

One of the essential objects of the invention is to provide an improved conveyor structure including means in the form of an endless belt conveyor operable at a predetermined rate to pull carpet material, such as burlap covered rubber, through the machine, and means in the form of two cooperating endless belts operable at a slower rate and adapted to apply a frictional drag to the carpet material so that it will be uniformly tensioned as it is advanced by the first mentioned means through the machine.

Another object is to provide a conveyor structure wherein the cooperating belts are relatively adjustable to vary the tension applied to the advancing carpet material.

Another object is to provide a conveyor structure that is simple in construction, economical to manufacture, easy to install and efficient in operation.

Other objects, advantages and novel details of construction of this invention will be made more apparent as this description proceeds, especially when considering in connection with the accompanying drawings, wherein:

Figure 1 is a side elevation of a machine for making a cemented pile carpet, and showing the conveyor structure embodying our invention;

Figure 2 is a vertical sectional view through a portion of the conveyor structure embodying our invention;

Figure 3 is a fragmentary top plan view of a portion of the structure illustrated in Figure 2.

Referring now to the drawings, 10, 11 and 12 respectively are endless belts of a conveyor structure embodying our invention and constituting a part of a machine illustrated generally in Figure 1 for manufacturing carpet of the cemented pile type.

As usual, the carpet material 13, such as burlap covered rubber, is advanced through the machine with the burlap side thereof uppermost so that the upper surface of the burlap may be coated or covered with an adhesive substance or cement as the carpet material passes through an adhesive applying mechanism 14.

The belts 10 and 11 are at the entrance end of the machine and cooperate with each other to withdraw the carpet material 13 from a roll 15, while the belt 12 is employed for advancing the carpet material 13 through the adhesive applying mechanism 14 and over suitable rotary beaters 16 which vibrate the carpet material after the adhesive substance is applied to the upper surface thereof.

Cut fibers, such as cut hair or the like, are discharged from one or more distributors (not shown) above the belt 12 onto the adhesive coating as the carpet material 13 is vibrated so that such fibers will be imbedded in the adhesive coating to form the cemented pile carpet.

In the present instance the endless belt 10 is reeved upon spaced rolls 20 and 21 respectively, carried by shafts 22 and 23 respectively journaled in a stationary frame 24 of the machine and in a frame 25 pivoted midway its ends upon the frame 24 of the machine, while the endless belt 11 is reeved upon spaced rolls 30 and 31 respectively, carried by shafts 32 and 33 respectively journaled in the frame 24 of the machine and in the pivoted frame 25. Preferably the bearings 34 and 35 for the shafts 23 and 33 are slidable longitudinally of the frame 25 so that the rolls 21 and 31 respectively are independently adjustable longitudinally of the pivoted frame 25. Any suitable means such as set screws 40 and 41 respectively threadedly engaging opposite ends of the pivoted frame 25 and engaging the bearings 34 and 35 for the shafts 23 and 33 may be employed for adjusting and holding the rolls 21 and 31 relative to each other.

By referring to Figure 2 it will be noted that the rolls 30 and 31 are disposed in staggered relation to the rolls 21 and 20 so that the adjacent portions of the belts 10 and 11 are nested or interlocked between the innermost rolls 21 and 31 respectively and thereby effectively grip the carpet material therebetween.

To vary the gripping action of the belts 10 and 11 we have provided the pivoted frame 25 with suitable ratchet mechanism 50 which preferably includes a ratchet wheel 51 fixed on a rock shaft 51a journaled in frame 24 and rigid with frame 25, an actuating lever 52 fixed on shaft 51a and carrying a spring-pressed dog 53 engageable with the teeth of the ratchet wheel 51, and a pair of spaced spring-pressed dogs 54 and 55 respectively carried by a bracket 56 rigid with the frame 24 of the machine and also engageable with the teeth of the ratchet wheel 51. Thus, an increased tension will be applied to the belts 10 and 11, causing them to grip the carpet material 13 more firmly when the pivoted frame 25 is adjusted in a counterclockwise direction by suitable manipulation of the actuating lever 52.

Any suitable drive means (not shown) may be provided for one or more of the shafts 22, 23, 32 and 33 respectively for the rolls 20, 21, 30 and 31 to drive the belts 10 and 11 so that the carpet material 13 will be withdrawn from the roll 15 and advanced toward the adhesive applying mechanism 14. Likewise, any suitable drive means (not shown) may be provided for the belt 12 so that it may advance the carpet material 13 through the adhesive applying mechanism 14 and over the rotary beaters 16 to the discharge end of the machine. However, the arrangement is preferably such that the cooperating belts 10 and 11 operate at a somewhat slower rate than the belt 12 and thereby apply a frictional drag to the carpet material 13 causing it to be tensioned uniformly as it is advanced by the belt 12 through the machine.

In use, the set screws 40 and 41 and the ratchet mechanism 50 may be readily adjusted to provide the belts 10 and 11 with the proper nested relation to effectively engage the carpet material 13 therebetween so that the tension desired may be obtained.

What we claim as our invention is:

1. In a machine of the class described having means for advancing sheet material; means for applying a frictional drag to said material so that it will be under tension while being advanced, comprising two pairs of longitudinally spaced rolls, endless flexible conveyors reeved upon said rolls, one conveyor to each pair, the rolls of one pair being staggered relative to the rolls of the other pair in the direction of advancement of the sheet material and one roll of each pair extending between the rolls of the other pair to deform adjacent portions of the conveyors and exert a gripping force on the sheet material therebetween, and means for adjusting one roll of each pair transversely of the conveyors to vary the gripping action on the sheet material.

2. In a machine of the class described having means for advancing sheet material; means for applying a frictional drag to said material so that it will be under tension while being advanced, comprising two pairs of longitudinally spaced rolls having parallel axes, endless conveyors reeved upon said rolls, one conveyor to each pair, the rolls of one pair being staggered relative to the rolls of the other pair whereby adjacent portions of said conveyors between the innermost of said rolls are in nested relation with each other to grip therebetween sheet material as it is advanced, a common support for one roll of each pair, and means for swinging the support about an axis parallel to the roll axes and located between the rolls carried thereby to vary the gripping force exerted by the conveyors on the sheet material.

3. In a machine of the class described having means for advancing sheet material; means for applying a frictional drag to said material so that it will be under tension while being advanced, comprising two pairs of longitudinally spaced rolls, endless conveyors reeved upon said rolls, one conveyor to each pair, the rolls of one pair being staggered relative to the rolls of the other pair whereby adjacent portions of said conveyors between the innermost of said rolls are in nested relation with each other to grip therebetween sheet material as it is advanced, a common support for one roll of each pair pivoted for swinging movement about an axis parallel to the roll axes and located between the rolls carried thereby and means for adjusting said support about its pivot to vary the gripping force exerted by the conveyors on the sheet material.

4. In a machine of the class described having means for advancing sheet material; means for applying a frictional drag to said material so that it will be under tension while being advanced, comprising two cooperating endless belts having adjacent surfaces thereof in nested relation for frictional engagement with opposite sides of the advancing sheet material, rolls for said belts, a member carrying one roll for each belt, and means for supporting the member for rocking movement about an axis extending between the rolls carried by the member in parallel relation to the axes of the latter rolls.

5. In a machine of the class described having means for advancing sheet material; means for applying a frictional drag to said material so that it will be under tension while being advanced, comprising a pair of fixed rolls, a swingable frame intermediate said fixed rolls, a second pair of rolls carried at opposite ends of said frame, a belt carried by one of said fixed rolls and the remote one of said second pair of rolls, and a second belt carried by the other of said fixed rolls and the other one of said second pair of rolls, said frame being swingable about an axis parallel to the axes of said rolls so as to apply variable pressure to material passing between the adjacent surfaces of said belts.

6. In a machine of the class described having means for advancing sheet material; means for applying a frictional drag to said material so that it will be under tension while being advanced, comprising two pairs of longitudinally spaced rolls, endless flexible belts reeved upon said rolls, one belt to each pair, the rolls of one pair being staggered relative to the rolls of the other pair in the direction of advancement of the sheet material, one roll of each pair extending between the rolls of the other pair to deform adjacent portions of the belts and exert a gripping force on the advancing sheet material therebetween, a stationary frame, a rock shaft in said frame, a frame rigid intermediate its ends with said rock shaft so as to rock therewith, shafts for one pair of rolls journaled in said stationary and rockable frames respectively, shafts for the other pair of rolls journaled in said stationary and rockable frames respectively, the journals for the shafts carried by said rockable frame being adjustable longitudinally in said rockable frame, and means for varying the gripping force exerted by said deformed portions of said endless belts, including means for rocking said rock shaft.

7. In a machine of the class described having means for advancing sheet material; means for applying a frictional drag to said material so that it will be under tension while being advanced, comprising two pairs of longitudinally spaced rolls, endless flexible belts reeved upon said rolls, one belt to each pair, the rolls of one pair being staggered relative to the rolls of the other pair in the direction of advancement of the sheet material, one roll of each pair extending between the rolls of the other pair to deform adjacent portions of the belts and exert a gripping force on the advancing sheet material therebetween, a stationary frame, a rock shaft in said frame, a frame rigid intermediate its ends with said rock shaft so as to rock therewith, shafts for one pair of rolls journaled in said stationary and rockable frames respectively, shafts for the other pair of rolls journaled in said stationary and rockable frames respectively, and means for varying the gripping force exerted by said deformed portions of said endless belts, including means for rocking said rock shaft.

8. In a machine of the class described having means for advancing sheet material; means for applying a frictional drag to said material so that it will be under tension while being advanced, comprising two pairs of longitudinally spaced rolls, endless flexible belts reeved upon said rolls, one belt to each pair, the rolls of one pair being staggered relative to the rolls of the other pair in the direction of advancement of the sheet material, one roll of each pair extending between the rolls of the other pair to deform adjacent portions of the belts and exert a gripping force on the advancing sheet material therebetween, a stationary frame, a rock shaft in said frame, a frame rigid intermediate its ends with said rock shaft so as to rock therewith, shafts for one pair of rolls journaled in said stationary and rockable frames respectively, shafts for the other pair of rolls journaled in said stationary and rockable frames respectively, and means for varying the gripping force exerted by said deformed portions of said endless belts, including ratchet mechanism carried by said stationary frame and rock shaft and adapted to rock the latter.

HAROLD P. FARIS.
JOHN E. WHITE.